United States Patent [19]

Günther et al.

[11] Patent Number: 4,493,377
[45] Date of Patent: Jan. 15, 1985

[54] ELECTRONIC TWO-HAND SAFETY SYSTEM FOR POWER TOOLS

[75] Inventors: Klaus Günther; Friedrich Hornung; Kurt Paule, all of Stuttgart; Fritz Schädlich, Leinfelden-Echterdingen, all of Fed. Rep. of Germany

[73] Assignee: Robert Bosch GmbH, Stuttgart, Fed. Rep. of Germany

[21] Appl. No.: 313,648

[22] Filed: Oct. 22, 1981

[30] Foreign Application Priority Data

Nov. 15, 1980 [DE] Fed. Rep. of Germany ....... 3043264

[51] Int. Cl.$^3$ ............................................. F16P 3/20
[52] U.S. Cl. .............................. 173/170; 192/129 A; 192/131 R; 200/DIG. 1; 200/157
[58] Field of Search .................. 173/170; 318/446; 200/DIG. 1, 157; 192/131 R, 129 A; 361/189, 190

[56] References Cited

U.S. PATENT DOCUMENTS

| | | | |
|---|---|---|---|
| 3,641,410 | 2/1972 | Vogelsberg | 200/DIG. 1 |
| 3,651,391 | 3/1972 | Vogelsberg | 200/DIG. 1 |
| 3,761,736 | 9/1973 | Malcolm | 200/DIG. 1 |
| 3,854,055 | 12/1974 | Sparks | 361/189 X |

FOREIGN PATENT DOCUMENTS 1266861 4/1968 Fed. Rep. of Germany ...... 318/446
2348644 11/1977 France .

*Primary Examiner*—James M. Meister
*Attorney, Agent, or Firm*—Frishauf, Holtz, Goodman & Woodward

[57] ABSTRACT

To permit operation of the power tool only if both hands of an operator are engaged, the tool is formed with a handle portion which has a sensing surface thereon, electrically coupled to a current flow sensing circuit, preferably including an opto-coupler or a field-effect transistor (FET) circuit which permits firing of a triac, thyristor, or the like only if current flows over the sensing surface by area contact therewith. The sensing surface is energized, preferably, from a resistive or capacitative voltage divider; the capacitative voltage divider has the advantage that the triac firing circuit can cause the triac to fire during null or zero crossings of ac supplied power. If a locking-type switch is used, two handles or touch-areas are needed; if a spring-loaded switch is provided, it can function as one safety element, and a touch-area sensing surface as the other.

26 Claims, 4 Drawing Figures

ELECTRONIC TWO-HAND SAFETY SYSTEM FOR POWER TOOLS

The present invention relates to the safety system for power tools, and particularly potentially hazardous tools such as punch-presses, saws, hedge-cutters or shears or the like which permit operation of the power tool only if the operator deliberately uses both hands, continuously, while the tool is in operation.

BACKGROUND

Various types of two-hand safety systems are used with hazardous, or potentially hazardous power tools of the electrical type. For example, a switch is connected to a mechanical linkage which permits operation of the switch if and only if two hand levers coupled to the linkage are simultaneously depressed, moved, or otherwise actuated. It has also been proposed to place two spatially separated switches in a circuit, both of which are spring-loaded, so that the electrical apparatus can be operated only if both switches are actuated against their spring loading which normally maintains them in OFF position. All such arrangements have the disadvantage that the position of the switches cannot be placed at random but is determined by the operating geometry and layout of the apparatus; in mechanical arrangements, particularly, the mechanical linkages and levers determine the placement of the operator's hands, so that ergometric considerations, and convenience of use cannot be fulfilled in many applications. Mechanical interlocks additionally have the disadvantage that they are subject to malfunction upon shock, contamination by dirt, and the like, and, similar to spring-loaded elements, have the further disadvantage that additional force must be applied by the operator which, over the period of a workday, is inconvenient and tiring. It has also been found in actual practice that many operators use ingenuity to override two-hand safety systems; mechanical switches, particularly, can often been overridden by unauthorized placement of metal bars, ropes, cables, or the like, so that the protective effort intended by the safety system is obviated.

THE INVENTION

It is an object to provide a two-hand safety system which does not interfere with the operator's normal use of tools or apparatus, is easily matched to the operator's manual convenience, and which is difficult to override.

Briefly, the apparatus utilizes an electrical switch with two individually actuable switch control elements. At least one of the switch control elements is an electrically responsive sensing surface, requiring surface engagement with at least a portion of the hand of the operator for actuation thereof. Thus, unless at least one sensing surface is engaged by touching, or placing the hand, or at least fingers thereagainst, the switch will be disabled. The other hand can then be occupied with operating, for example, a spring-loaded switch or pushbutton.

The system can readily be expanded by using two spatially separated areal sensing elements, that is, by using two electrically responsive surfaces applied, for example, to separate handles to be grasped by the respective right and left hands of the operator, with a main locking ON-OFF switch. Thus, the tool can be placed in operation only if both handles are grasped.

The system has the advantage that no pressure need be applied to the safety switching element. It is difficult to override an areal or surface type switch. No mechanically movable elements are used. The sensing surfaces can readily be applied to the handles of tools, for example to two handles of chainsaws, shears, or to separate operating handles of punch presses or the like. No specific force is necessary for operation of the switch elements.

In accordance with a desirable feature of the invention, two surface or areal switches are used, both being formed with sensing surfaces. This embodiment permits installation of locking-type main switches so that no spring pressure has to be overridden by manual effort on part of the operator. The sensing surfaces are connected directly over ohmic or capacitative voltage dividers with the power supply network. Additional resistors are used to exclude danger from electrical shock to the operator. Preferably, each portion of a network supply has a resistor, and/or a capacitor connected therein, which then are joined at a common voltage divider junction; the sensing surfaces are connected to the common junction over a further protective resistor. The maximum current which can flow to the sensing surfaces thus can be easily limited to levels at which no harm occurs. In accordance with a particularly preferred feature, the resistors or capacitors in each branch of the network supply are made to be approximately of the same value, so that the operation of the unit will not depend on the polarization of a connecting plug of a tool with a network supply socket.

Voltage drop can be measured across resistors, and the measured value provides an indication if the sensing surfaces have be touched or not. It is still, however, desirable to include an opto-coupler in the supply lines to the sensing surfaces. This bridges the voltage difference between the sensing surface and the control input to a control switch for the power tool. Many such power tools use triacs and use of opto-couplers provide a particularly simple evaluation of the condition of the sensing surfaces—whether they are touched or not. The light generating element of the opto-coupler, in a preferred form, is a glow-lamp which responds directly to the current supplied by the surfaces which are touched or grasped by the operator. Transistors or field-effect transistors (FETs) may also be used as current sensors.

The electrical apparatus, typically an electrical motor, preferably is directly connected to the power network through a triac or a thyristor, rather than energized directly through a mechanically movable switch or circuit breaker, or relay. The current sensor, thus, can be used to control firing of the triac or thyristor, for example by introducing a coupling and trigger circuit between the opto-coupler and the triac or thyristor. This arrangement is particularly suitable if the triac or thyristor, and/or the coupling and trigger circuit is already present, for example to provide speed control of the motor. Circuits of this type are available commercially as integrated circuits, and inexpensive circuits can be constructed using R/C firing circuits. Such circuits can readily be combined with the two-hand safety circuit of the present invention.

The entire handle, or at least the entire portion of a handle which is normally touched or grasped for operation of the power tool can be covered with a sensing surface, so that a particular area of the handle is not the only one which permits operation of the tool, so that the user can have a high degree of flexibility in his/hers individual handling of the tool and convenience of grasping thereof.

The system is particularly applicable in connection with power tools and power equipment where two-hand operation is mandated by safety laws and regulations, or where it is desirable from the standpoint of safety to the user or operator. Particular fields of application are punching machines, and electrical hand tools such as hedge-shears, circular saws or chain saws.

DRAWINGS

BASIC PRINCIPLE WITH REFERENCE TO FIG. 1

Figure 1:
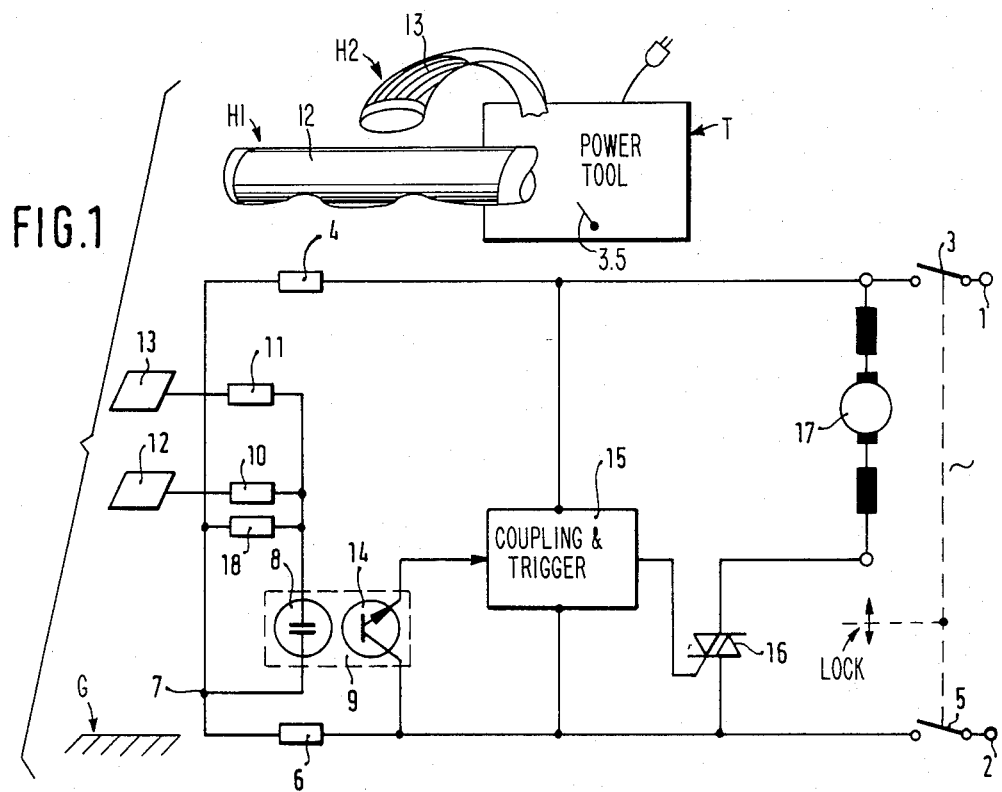
FIG. 1 is a schematic view of a portion of an electrical power tool, and of the schematic circuit to protect the user of the power tool by requiring two-hand holding thereof.

A power tool T, shown only schematically and in block form since it may be of any type is connectable by an electrical plug to a power socket. The terminals are shown in the diagram, 1, 2. The network terminals 1, 2, are each connected to switch terminal 3, 5. The switch structure which includes the terminals 3, 5, is of the locking type, schematically indicated by the double arrow; in other words, the switch, will move to a stable OFF position remains OFF and can be changed over to a stable ON position. An ordinary self-hold switch may be used. Switch 3 is connected to a resistor 4; switch 5 is connected to a resistor 6. The two terminals of the resistors 4, 6, remote from the switches 3, 5 form a junction 7. The junction 7 is connected to one terminal of the glow-lamp 8 which is part of an opto-coupler 9. The opto-coupler 9, specifically the glow-lamp 8 thereof, has its other terminal connected to protective resistors 10, 11 which, each, are connected to respective sensing or touch surfaces 12, 13. The surfaces 12, 13 are also shown in FIG. 1 applied to two handles H1 and H2 of the power tool T.

Light from glow-lamp 8 of the opto-coupler 9 is picked up by a photo-transistor 14, the collector of which is connected to the terminal 2, which includes the switch 5. Its emitter is connected to a coupling and trigger circuit 15. The coupling and trigger circuit is energized from the power supply lines connected to the terminals 1, 2. The coupling and trigger circuit 15, for example, is the integrated circuit commercially available under type TDA 1085A made by Motorola. Its output is connected to a triac 16 which is serially connected to an electric motor 17, which provides the power of the power tool T. The motor 17 and triac 16 are serially connected between the the power terminals controlled by the switches 3, 5. A resistor 18 is connected between the junction 7 and the other terminal of the glow-lamp 8, to which also the protective resistors 10, 11 are connected.

OPERATION

Power is supplied to terminals 1, 2. The switch terminal 3, 5, which are mechanically coupled and conjointly operated, form the main power switch of the tool T. The two sensing surfaces 12, 13 require two-hand grasping of the two handles H1, H2, so that the switch 3, 5, can be of the locking type. Resistors 4, 6 are, preferably, of approximately equal resistance value, and, together, form an ohmic voltage divider with a junction or tap point 7. Rather than using an ohmic voltage divider, a capacitative voltage divider can be used, by replacing the resistors 4, 6, by capacitors. The sensing surfaces 12, 13 are supplied with power from junction 7 through resistor 18. Resistors 10, 11, form protective resistors and must be dimensioned in accordance with the voltage of the power to be supplied to terminals 1, 2, and appropriate safety regulations. Resistors 10, 11, limit the current which may flow through the body of the operator to a value which is harmless. Resistors 10, 11, together with resistor 18 generate a threshhold limit. The threshhold limit is so selected that if only one of the surfaces 12, or 13 is touched, the glow-lamp 8 will not reach trigger or ignition voltage. Sufficient voltage drop across resistor 18 will be obtained only if both surfaces 12, 13 are touched, or coupled to the hands of the user, for example by capacitative coupling. Upon ignition of the glow-lamp 8, photo-transistor 14 is energized which, over the commercially available coupling and trigger 15 fires the triac 16. Motor 17, for example, driving a hedge-shear now will start up. If one of the surfaces 12 or 13 is released, glow-lamp 8 extinguishes, and the coupling and trigger circuit will inhibit application of signals to the triac 16 which will not fire anymore and the apparatus will stop.

The sensing surfaces 12, 13 are applied to the handles H1, H2 either in blank, metallic form, or beneath a layer of insulating material, for example a thin sheet or layer of plastic. If blank, the surfaces are directly engaged by the hands of the operator; if insulated, they form a capacitor with the hand of the operator. A closed circuit will be established between network and ground, schematically shown at G, which is closed either by ohmic or capacitative coupling. In many arrangements it is desirable to initially utilize capacitative coupling to permit operation of the tool by an operator wearing gloves.

EMBODIMENT OF FIG. 2

The network supply terminals 1, 2 are connected to switch terminals 20, 21. In contrast to the switch of FIG. 1, the terminals 20, 21 are spring-loaded as schematically shown by the spring-force arrow S, coupled to the connecting coupling of the terminals 20, 21. Motor 17 and triac 16 are serially connected as in the embodiment of FIG. 1. A capacitor 22 is connected to the terminal 2, when switch 20 is closed; the other side of the capacitor 22 is connected to a junction 23. The series circuit of a resistor 24 and a capacitor 25 are connected from the junction 23 to the other terminal 1 through spring-loaded switch 21. A glow-lamp 26 of an opto-coupler 27 is connected to junction 23, the other terminal of which is connected to a resistor 28 to sensing surface 29. A tap point is provided between the capacitor 25 and the resistor 24 to which a photo-resistor 30 of the opto-coupler is connected. The other terminal of the photo-resistor 30 is connected to a trigger diode 31 which, in turn, triggers the triac 16. A resistor 32 and a capacitor 33, in parallel connection, are connected between the photo-resistor 30 and the trigger-diode 31 on the one hand, and between resistor 24 and switch 21 on the other.

OPERATION

Basically, the operation is similar to the circuit of FIG. 1. Only one sensing surface 29, however, is provided, so that the coupled switch terminals 20, 21 should be spring-loaded, rather than of the locking type. The threshhold level for the glow-lamp is so set that it will light upon coupling to surface 29. Resistor 24 generates a auxiliary voltage which, for example, may be between 10 and 20% of network voltage. It is applied to the capacitor 33 over the photo-resistor 30. Upon illumination of glow-lamp 26 by contact with surface 29, the photo-resistor 30 will become of low resistance value and provide a trigger pulse for triac 16, as well known. Resistor 32 prevents charging of capacitor 33 through the dark-resistance of the photo-resistor 30.

The voltage divider is a capacitative voltage divider, in which the voltage at the junction 23 is divided by the capacitors 22, 25. This has the advantage that the auxiliary voltage obtained across resistor 24 will lead the network voltage by approximately 90°, so that the triac will fire at a time when the alternating current network voltage passes through 0 or null.

EMBODIMENT OF FIG. 3

The switch terminals 3, 5, are connected to the network terminals 1, 2, and two sensing surfaces are provided. Thus, terminals 3, 5, can be of the locking type as schematically indicated by the double arrow in FIG. 3. Triac 16 is serially connected to the motor 17. Switch terminal 3 is connected to a capacitor 40 which is serially connected to a resistor 41. Switch terminal 5 is connected to a capacitor 42, serially connected to a resistor 44. Resistors 41, 44 have their other terminals connected together to form a common junction 45. The trigger input of the triac 16 is connected between capacitor 43 and a further resistor 42. A trigger diode 46, as well as the source-drain paths of field-effect transistors (FETs) 47, 48 are connected between the capacitors 40, 43 and the adjacent terminals of resistors 41, 44. The gate of FET 47 is connected over capacitor 49 and resistor 50 to the junction 45. The gate of FET 48 and a capacitor 49 are likewise connected to junction 45. A sensing surface 53 is connected over resistor 54 and diode 55 with junction 45; a diode 56 is connected to resistor 54 and to the gates of FET 57 and to resistor 54 and surface 53.

Sensing surface 57 is connected to a resistor 58 which, in turn, is connected over a diode 59 to the junction 45, and over a diode 60 to the gate of FET 48.

OPERATION

The capacitors 40, 43 form a capacitative voltage divider, which, preferably has a division ratio of 1:1. The FETs 47, 48 form a controllable resistor which either provides a short circuit across the trigger diode 46 or an open circuit. The FETs will have low resistance unless a gate voltage is applied. Thus, under low resistance condition, an essentially pure sinusoidal current will flow through capacitors 40, 43, FETs 47, 48 and resistor 42. Resistor 42 is of such dimensions that the voltage drop due to this quiescent current will be insufficient to cause triac 16 to fire. If surface 53 is touched, a half-wave will flow from the junction 45 of the drainage current over diode 55 and resistor 54; the other half-wave will flow over capacitor 49, diode 56 and resistor 54 to ground G. This charges capacitor 49, the FET 47 will receive gate voltage and will switch to high resistance condition. The same cycle will occur when the surface 57 is touched; the FET 48 will then block. When both surface 53 as well as 57 are covered or touched, however, both FETs 47, 48 will block so that the voltage on trigger diode 46 will rise. When the breakthrough voltage is reached, trigger diode 46 becomes conductive and the voltage drop will cause a current pulse to occur which is sufficient to cause triac 16 to fire. The voltage drop across resistor 42, upon such a current pulse, will be substantially higher than upon sinusoidal quiescent current. The breakthrough voltage on the trigger diode will occur while the capacitors 40, 43, recharge in reverse polarity. This means that, with respect to network voltage, the current will lead by 90° and the trigger pulses for the triac are again applied at the desirable instant of time of the ac current supply when the voltage passes through 0 or null. When the triac is fired, full network is available for the motor 17. There will be no phase control of the motor by merely this operation, that is by the two-hand safety circuit. Upon release of either one or both of the surfaces 53, 57, resistors 50 and 52 permit discharge of the capacitors 49, 51.

Figure 3:
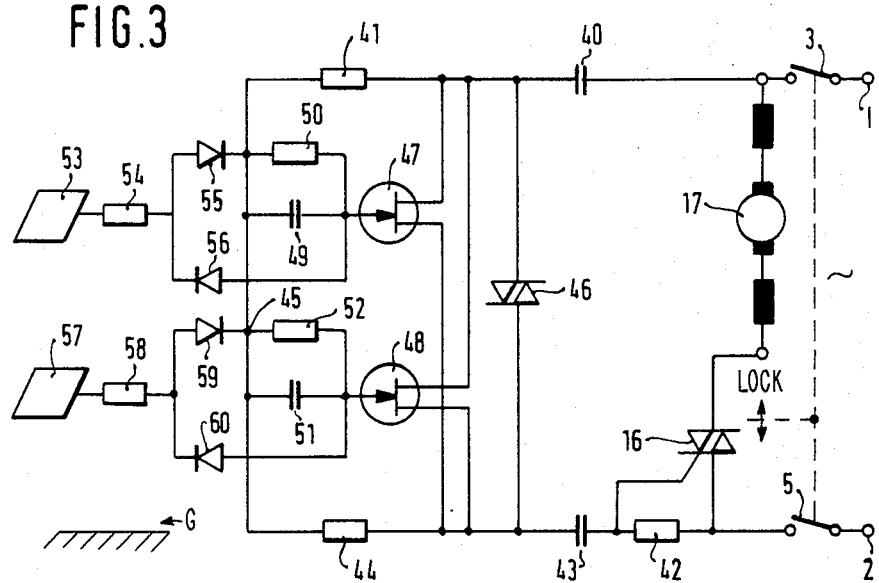
FIG. 3 is a diagram utilizing field effect transistors as current sensors.

It is of course equally possible to construct a circuit of FIG. 3 with a single sensing surface. One of the FETs and the associated control network will then be omitted. For one-hand control, of course, the switch terminals 3, 5, should be of the spring-load, that is of the non-locking type.

EMBODIMENT OF FIG. 4

Figure 4:
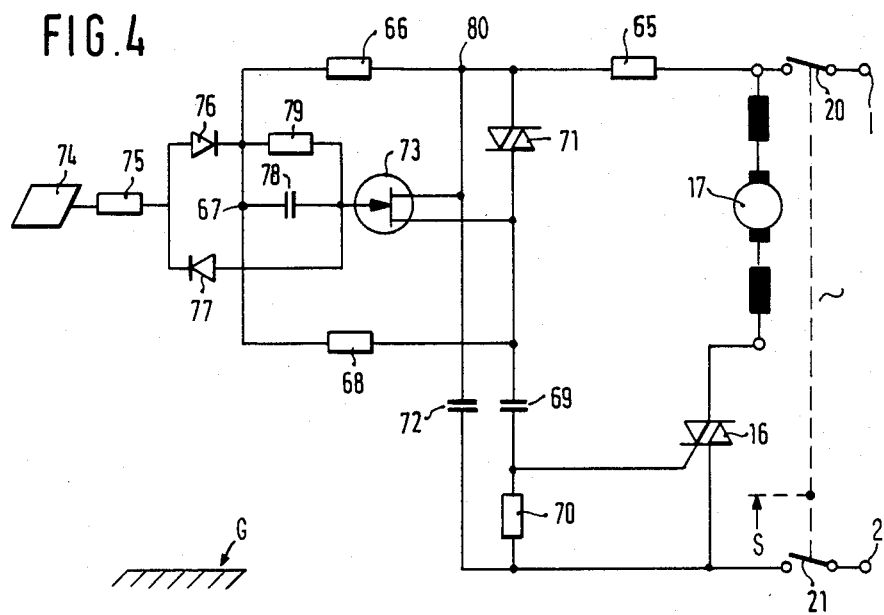
FIG. 4 is a circuit diagram using a single sensing surface and one FET.

FIG. 4 illustrates a variation of the circuit of FIG. 3, using a spring-loaded non-locking type main switch, as schematically indicated by the spring force arrow S coupled to the switchblades 20, 21. Motor 17 and triac 16 is serially connected across the main switch 20, 21. A resistor 65 is connected to terminal 1 of the network through switchblade 20, the free terminal of which is connected to a further resistor 66, which is connected, in turn, to a junction 67. A resistor 68 is connected to junction 66 which is connected to a capacitor 69. Capacitor 69 is connected over resistor 70 with switchblade terminal 21. The trigger input of triac 16 is connected between the capacitor 69 and resistor 70. A connection coupled between the resistors 65, 66 leads to a trigger diode 71, which is connected to the junction between capacitor 69 and resistor 68. Further, the junction 80 between resistors 65, 66 is connected to a capacitor 72 and to the source terminal of FET 73. The drain terminal of FET 73 is connected to the other terminal of the trigger diode 71. Capacitor 72 is connected between the junction 80, which also forms a source connection of FET 73 and the switchblade 21. A sensing surface 74 is connected through a resistor 75 to two reversely polarized diodes 76, 77; diode 76 is connected to the junction 67; diode 77 is connected to the gate terminal of the FET 73 which, additionally, is connected to the parallel connection of a capacitor-resistor network 78, 79 to the junction 67.

This circuit uses a mixed ohmic-capacitative voltage divider, formed by the resistor 65 and the capacitor 72 with divider junction 80 therebetween. This type of voltage divider has the advantage that it simultaneously operates as a R/C network filter which short circuits stray, noise, and interference pulses from the network through the capacitor 72.

OPERATION

The capacitor 69 transfers trigger pulses from the trigger diode 71 to the trigger or firing input of the triac 16. Resistor 65 is, preferably, so dimensioned that it is equal to the reactive impedance, at network frequency, of the parallel connections of the capacitors 69, 72. Resistor 70 is so dimensioned that the triac will not fire based only on the sinusoidal quiescent current of the system.

The sensing surface 74 affects the FET 73 similarly as described in connection with FIG. 3. If the surface 74 is not touched, FET 73 is conductive and the trigger diode 71 will not provide trigger pulses, and the triac 16 will not fire. Upon engagement of the surface 74, FET 73 blocks, and the trigger diode 71 will trigger the triac 16 in accordance with well-known trigger circuit operation.

Use of a trigger diode, in combination with a capacitive or capacitive/resistive divider network of FIGS. 3 and 4 has the advantage that only a minimum number of components need be used while, simultaneously, good resistance against stray, noise or interference pulses is obtained. Placing the main current carrying paths of the FETs 47, 48 and 73, respectively, in parallel to the trigger diode reliably insures that the trigger diode will not fire unless at least one of the surfaces of FIG. 3 if used with one surface, or both of the surfaces of FIG. 3 as shown or, respectively, the surface 74 of FIG. 4 is touched. To insure reliable firing of the triac, the respective sensing surfaces 53, 57, 74 are preferably connected to the resistance-diode networks, as shown, so that current flow will applied to the gate terminals of the FETs 47, 48, 73 through the respective diode-resistance networks. This permits the utilization of either the negative or the positive half-wave to control the FETs forming a controllable switching element.

Use of an ohmic voltage divider, with resistors connected in parallel to the trigger diode, see, for example, FIGS. 3, 4 resistors 41, 44; and 66, 68, respectively, has the advantage that the sensing surfaces can be connected to the center point or tap of the ohmic voltage dividers. Capacitors or additional resistors in the main current circuit can be used, additionally, with the voltage dividers, thus increasing the operating reliability, as well as the safety of the circuit. The R/C network of the main current circuit can be used, simultaneously, as a trigger or ignition circuit for the triac upon connecting the gate cathode path of the triac or of the thyristor across a further resistor.

Various changes and modifications may be made in features described in connection with any one of the embodiments may be used with any of the others, within the scope of the inventive concept; specifically, the circuit of FIG. 3 is not limited to two sensing surfaces, but, upon suitable dimensioning, a single sensing surface with a spring-loading type switch may be used.

The main switch, particularly of the locking type (FIGS. 1, 3) may have an additional separate safety button requiring unlatching thereof before the switch 3, 5 can be operated and which is connected to the main current circuit of the motor, to drop out upon disconnection of the motor so that the switches 3, 5 will drop out automatically upon release of one of the handles, requiring deliberate reclosing of the switch 3, 5 before operation of the tool can be resumed. A self-lock and holding relay, in the well-known self-holding circuit, which may be mechanical or solid-state, can be used, for example.

In the embodiment of FIG. 1, the circuit components used were:
resistors 4, 6: 47K
resistors 10, 11: 4.7μ
resistor 18: 2.2μ
network voltage: 220 V. Surface are of touch surfaces 12, 13: 10 cm². Frequency 50 Hz. The touch surfaces were insulated with respect to the hands of the user.

Figure 2:
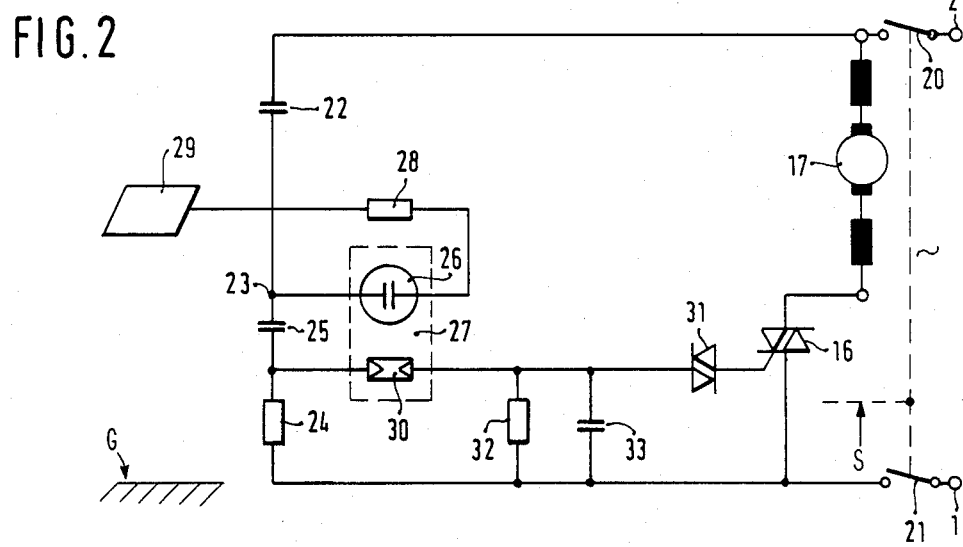
FIG. 2 shows only the circuit diagram of a particularly simple circuit.

In the circuit of FIG. 2,
capacitors 22, 25 were: 0.1μ
resistor 28 was: 2.2μ. Power: 220 V at 50 Hz.
the surface area 29 was 25 cm², and it was insulated with respect to the hands of the user.

In the embodiment of FIG. 3.
capacitors 40, 43 were 0.22μ
resistors 41, 44 were: 4.7K
resistors 54, 58 were: 10μ
resistor 42 was: 100
surfaces 54, 57 had 25 cm² and were insulated. Voltage 220 V at 50 Hz.

In the embodiment of FIG. 4,
resistors 65, 70 were 22K, 100
resistors 66, 68 were 4.7K
capacitor 69 was: 0.1μ
capacitor 72 was: 0.047μ
resistor 75 was: 10μ
network voltage: 220 V
network frequency 50 Hz.

We claim:

1. Operator safety system for power tools having
    a power supply connection (1, 2);
    a motor (17);
    a controlled switch (16) coupled to the motor for selective connection of the motor to the power supply connection;
    and an operator touch-controlled switch including
    at least one electrically responsive sensing surface (12, 13, 29, 53, 54, 74) requiring surface engagement of at least a portion thereof by a hand of the operator for activation thereof to enable the tool to operate,
    and an energization and control circuit for said touch-controlled switch comprising
    a voltge divider (4, 6; 22, 25; 40, 41, 43, 44; 65, 72, 66, 68) connected to the power supply connection, said voltage divider having a common junction or tap point (7, 23, 45, 67, 80);
    a coupling circuit (10, 11; 28; 54, 58; 75) coupling the at least one sensing surface to the common junction;
    and an electrical recognition network (8, 18, 9; 27, 47, 48; 69, 73) coupled to the common junction and connected to and controlling the controlled switch (16) to ON condition and thus permit energization of the motor only if the at least one sensing surface is engaged by a hand of the operator.

2. System according to claim 1, wherein the voltage divider comprises a resistor-type voltage divider (4, 6).

3. System according to claim 1, wherein the voltage divider comprises a capacitor-type voltage divider (22, 25; 40, 43).

4. System according to claim 1, wherein the voltage divider comprises a resistor-capacitor-type voltage divider (40, 41, 43, 44; 65, 72, 66, 68).

5. System according to claim 1, wherein the voltage divider comprises two impedance elements (4, 6; 22, 25; 40, 43) which are of essentially equal impedance value to place the tap or junction of the voltage divider electrically at the midpoint of said impedance elements.

6. System according to claim 1, wherein the power supply connection has two terminals (1, 2);
and wherein the voltage divider includes a resistor (65) connected to one terminal (1);
a capacitor (72) connected to the other terminal (2), said resistor and capacitor being serially connected by said common junction (80).

7. System according to claim 1, wherein the recognition network comprises
a current sensitive response element (9, 27, 47, 48, 73) connected to the sensing surface and sensing change of current flow upon engagement or approach of the surface by the hand of the operator.

8. System according to claim 1, wherein the recognition network comprises
an opto-coupler connected between the sensing surface (12, 13, 29, 74) and the junction (7, 23) and controlling the controlled switch (16) and forming a current sensitive response element.

9. System according to claim 8, wherein the opto-coupler includes a glow lamp (98, 26).

10. System according to claim 7, wherein the current sensitive response element comprises a transistor.

11. System according to claim 10, wherein the transistor is a field-effect transistor (47, 48, 73).

12. System according to claim 7, wherein the controlled switch (16) comprises a solid-state power switching element including at least one of: a triac; a thyristor,
said solid-state switch being connected to the current supply terminals and being fired under control of said current sensitive response element.

13. System according to claim 7, further including a coupling or trigger circuit (15) connected between the current sensitive response element and the controlled switch (16) to provide firing or trigger power to said switch under control of the current sensitive response element.

14. System according to claim 13, wherein said trigger circuit includes a resistor-capacitor circuit (32, 33; 42, 43; 69, 70).

15. System according to claim 7, wherein the recognition network, upon recognizing that at least a portion of a hand of the operator touches the at least one electrically responsive surface causes a change in the voltage at the common junction of the voltage divider;
and a trigger diode (46, 71) is provided, connected to and controlled by the current sensitive response element and having its conduction state controlled thereby, and providing trigger pulses to said controlled switch (16).

16. System according to claim 15, wherein the current sensitive response element comprises
a field effect transistor (FET) (47, 48; 73);
the trigger diode (46, 71) is coupled across said power supply connection;
and the field effect transistor is connected in parallel across the trigger diode to, selectively, change the voltage across the trigger diode as a function of engagement of the hand of the operator with the at least one electrically responsive sensing surface.

17. System according to claim 16, wherein two field effect transistors (47, 48) are provided, connected across the trigger diode (46);
two electrically responsive surfaces (53, 57) are provided, each connected to a respective coupling circuit (49, 50, 54, 55, 56; 51, 52, 58, 59, 60), each coupling circuit being connected to and controlling conduction of a respective field effect transistor, to control the respective field effect transistor to ON, or conductive state, if, and only if, a hand of the operator engages the respective sensing surface to control the voltage across the trigger diode to drop to a low level only if both of the field effect transistors (47, 48) are controlled to conductive condition.

18. System according to claim 16, wherein one field effect transistor (73) is provided, having its source-drain path connected across the trigger diode (71);
and the coupling circuit (75, 76, 77, 78, 79) is connected to the gate of said field effect transistor to change the resistance state of said field effect resistor to low or conductive level when the electrically responsive sensing surface (74) connected to the coupling circuit is engaged by a hand of the operator.

19. System according to claim 18, wherein the voltage divider comprises a resistor (65) and a capacitor (72);
and the trigger diode (71) is connected to the common junction (80) of the voltage divider and across the capacitor (72).

20. System according to claim 1, wherein said tool has at least one handle (H1, H2);
and the at least one sensing surface is applied to cover at least a portion of the surface area of the at least one handle.

21. System according to claim 20, wherein the handle has a gripping portion;
and the sensing surface covers essentially the entire gripping portion thereof.

22. System according to claim 20, wherein the tool has two handles (H1, H2);
a main power switch (3, 5) of the locking type is provided;
and the handles (H1, H2) each have a sensing surface applied thereto, the sensing surfaces (12, 13; 53, 57) on the respective handles (H1, H2), each, requiring engagement or coverage by the respective hands of the operator to enable the tool to operate.

23. System according to claim 1, wherein the operator touch-controlled switch includes two electrically responsive sensing surfaces (12, 13; 53, 57), each being coupled to a respective coupling circuit, said coupling circuits commonly controlling the electrical recognition network.

24. System according to claim 1, wherein said coupling circuit includes at least one resistor (10, 11; 28; 54, 58, 75) serially connected with the at least one respective electrically responsive sensing surface.

25. System according to claim 15, including a further voltage divider comprising a resistor (65) and a capacitor (72) having a resistor/capacitor junction (80); wherein
the trigger diode (71) is connected to the resistor/capacitor junction (80) of the further voltage divider and across the capacitor (72);
wherein said controlled switch comprises at least one of: a triac (16); a thyristor;

a resistance-capacitance series circuit (70, 69) having a junction point being connected to the terminal of the trigger diode (71) remote from said resistor/capacitor junction, said junction point being connected to the gate of the controlled switch (16);

and wherein the voltage divider comprises an ohmic voltage divider (66, 68), connected across the trigger diode (71) and having the common junction (67), the common junction being connected to the gate of the field effect transistor (73) and recognizing imbalance thereat upon engagement of a hand of the operator with the at least one electrically responsive sensing surface.

26. System according to claim 18, wherein said controlled switch comprises at least one of: a triac (16); a thyristor;

a resistance-capacitance series circuit (42, 43) is provided, having a junction point, and being connected to one terminal of the trigger diode (71), the junction point being connected to the gate of the controlled switch;

and wherein said voltage divider comprises two capacitors (40, 43), one of which is common to the capacitor of said resistance-capacitance series circuit, connected across the power supply connection, and two serially connected resistors (41, 44), each connected to a respective capacitor (40, 43) and to said common junction (45);

and wherein the coupling circuits connected to the respective electrically responsive sensing surfaces (53, 57) are, each, connected to said common junction (45) and to respective gates of the field effect transistors (47, 48) and include, each, a coupling resistor (54, 58).

* * * * *